United States Patent
Morovic et al.

(10) Patent No.: US 10,171,706 B2
(45) Date of Patent: Jan. 1, 2019

(54) CONFIGURING AN IMAGING SYSTEM

(71) Applicant: HEWLETT-PACKARD DEVELOPMENT COMPANY, L.P., Houston, TX (US)

(72) Inventors: Peter Morovic, Sant Cugat del Valles (ES); Jan Morovic, Colchester (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 15/520,303

(22) PCT Filed: Oct. 30, 2014

(86) PCT No.: PCT/EP2014/073341
§ 371 (c)(1),
(2) Date: Apr. 19, 2017

(87) PCT Pub. No.: WO2016/066202
PCT Pub. Date: May 6, 2016

(65) Prior Publication Data
US 2017/0324884 A1  Nov. 9, 2017

(51) Int. Cl.
*H04N 1/60* (2006.01)
*H04N 1/00* (2006.01)
(Continued)

(52) U.S. Cl.
CPC ......... *H04N 1/6016* (2013.01); *G06F 17/18* (2013.01); *H04N 1/6041* (2013.01); *G06K 2009/487* (2013.01)

(58) Field of Classification Search
None
See application file for complete search history.

(56) References Cited

U.S. PATENT DOCUMENTS 6,568,787 B1 * 5/2003 Girones ............... B41J 2/16508
347/22
6,995,865 B1 * 2/2006 Motomura ........... H04N 1/6058
358/1.9
(Continued)

FOREIGN PATENT DOCUMENTS

CN       102789152     11/2012
EP       0763929       3/1997
(Continued)

OTHER PUBLICATIONS

Balasubramanian R Ed. Institute of electrical and electronics engineers. Colorimetric modeling of binary color printers.
(Continued)

*Primary Examiner* — Madelein T Nguyen
(74) *Attorney, Agent, or Firm* — HP Inc. Patent Department

(57) ABSTRACT

Examples of a method and a system for configuring an imaging system are described. These examples involve obtaining a random sample of area coverage representations and grouping these by an estimated color, such as a colorimetric value. In each group a selected area coverage representation is determined with respect to one or more imaging attributes. A color gamut based on the random sample and the selected area coverage representations are used to generate a color mapping from an input color space to an area coverage representation space for use by the imaging system.

20 Claims, 3 Drawing Sheets

(51) Int. Cl.
*H04N 1/56* (2006.01)
*G06F 17/18* (2006.01)
*G06K 9/48* (2006.01)

(56) References Cited

U.S. PATENT DOCUMENTS

| | | | |
|---|---|---|---|
| 7,292,728 B1 | 11/2007 | Gupta et al. | |
| 7,773,256 B2* | 8/2010 | Edge | H04N 1/6016 358/1.9 |
| 8,213,055 B2 | 7/2012 | Morovic et al. | |
| 9,584,700 B2* | 2/2017 | Morovic | |
| 9,706,084 B2* | 7/2017 | Morovic | H04N 1/6033 |
| 2003/0002061 A1* | 1/2003 | Van de Capelle | H04N 1/54 358/1.9 |
| 2003/0210431 A1 | 11/2003 | Rylander et al. | |
| 2005/0185837 A1* | 8/2005 | Takano | H04N 1/4072 382/162 |
| 2008/0055355 A1* | 3/2008 | Hersch | H04N 1/6025 347/19 |
| 2009/0201309 A1* | 8/2009 | Demos | G01J 3/02 345/589 |
| 2009/0296091 A1* | 12/2009 | Skinner | G01J 3/52 356/402 |
| 2009/0310154 A1* | 12/2009 | Morovic | H04N 1/54 358/1.9 |
| 2010/0214576 A1* | 8/2010 | Morovic | H04N 1/52 358/1.9 |
| 2011/0033108 A1 | 2/2011 | Tin et al. | |
| 2012/0086721 A1 | 4/2012 | Morovic et al. | |
| 2013/0215472 A1* | 8/2013 | Rossier | H04N 1/4055 358/3.06 |
| 2014/0016143 A1* | 1/2014 | Morovic | H04N 1/6016 358/1.9 |
| 2015/0116329 A1* | 4/2015 | Hao | G06T 11/206 345/440 |
| 2015/0156369 A1* | 6/2015 | Reed | H04N 1/32309 382/100 |
| 2015/0324996 A1* | 11/2015 | Rius Rossell | H04N 1/6072 358/3.06 |
| 2015/0365565 A1* | 12/2015 | Morovic | H04N 1/603 358/1.9 |
| 2015/0373229 A1* | 12/2015 | Morovic | B41J 2/17546 358/1.9 |
| 2016/0032120 A1* | 2/2016 | Morovic | C09D 11/32 347/100 |
| 2016/0034795 A1* | 2/2016 | Morovic | H04N 1/54 358/1.9 |
| 2016/0034796 A1* | 2/2016 | Morovic | H04N 1/6033 358/3.09 |
| 2016/0037017 A1* | 2/2016 | Morovic | H04N 1/32309 358/3.28 |
| 2016/0057314 A1* | 2/2016 | Morovic | H04N 1/6025 358/3.23 |
| 2016/0155032 A1* | 6/2016 | Morovic | H04N 1/6025 358/504 |
| 2016/0173732 A1* | 6/2016 | Garcia Reyero Vinas | H04N 1/52 386/278 |
| 2016/0198064 A1* | 7/2016 | Bai | H04N 1/54 382/100 |
| 2017/0048420 A1* | 2/2017 | Morovic | G01J 3/46 |
| 2017/0048421 A1* | 2/2017 | Morovic | H04N 1/54 |
| 2017/0064145 A1* | 3/2017 | Morovic | H04N 1/6055 |
| 2017/0126931 A1* | 5/2017 | Morovic | H04N 1/6008 |
| 2017/0257527 A1* | 9/2017 | Encrenaz | B41J 2/2103 |

FOREIGN PATENT DOCUMENTS

| | | |
|---|---|---|
| WO | WO-2005043884 | 5/2005 |
| WO | WO-2011126480 | 10/2011 |
| WO | WO-2014117803 | 8/2014 |

OTHER PUBLICATIONS

Balasubramanian R. A Printer Model for Dot-On-Dot Halftone Screens.

Balasubramanian R. Optimization pf the spectral neugebauer model for printer characterization.

Chen Y et al. Sx Color printer characterization using optimized cellular Yule-Nielsen spectral Neugebauer model.

Morovic J et al. Hans: Controlling Ink-Jet Print Attributes Via Neugebauer Primary Area Covergaes.

Peter Morovič et al., Optimizing HANS Color Separation: Meet the CMY Metamers (Research Paper); Date Unknown.

Rotea M et al. Robust estimation algorithm for spectral neugebauer models.

\* cited by examiner

CONFIGURING AN IMAGING SYSTEM

BACKGROUND

Imaging systems may be arranged to output an image. They may comprise printing or display systems, wherein an output is either a printed or displayed image. In these cases, color data for the image may be represented in a first color space, such as a Red, Green, Blue (RGB) color space. An imaging system may have a limited number of output channels such as colorants or light-emitting elements. As such, it may be necessary to map the color data to a second color space that is used to produce the output. Area coverage representations, such as Neugebauer Primary area coverages for example, may be used in this second color space. There may be multiple area coverage representations that can be mapped to a particular color in the first color space. These are referred to as metamer sets. To determine a metamer set, due to the high dimensionality of the second color space, a polyhedral search may be used.

BRIEF DESCRIPTION OF THE DRAWINGS

Various features and advantages of the present disclosure will be apparent from the detailed description which follows, taken in conjunction with the accompanying drawings, which together illustrate, by way of example only, features of the present disclosure, and wherein.

DETAILED DESCRIPTION

Figure 1:
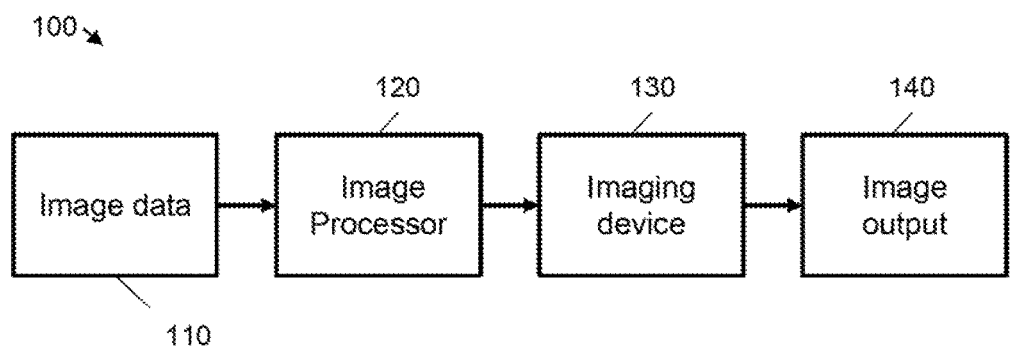
FIG. 1 is a schematic illustration showing an imaging system according to an example.

In the following description, for purposes of explanation, numerous specific details of certain examples are set forth. Reference in the specification to "an example" or similar language means that a particular feature, structure, or characteristic described in connection with the example is included in at least that one example, but not necessarily in other examples.

Imaging systems may be configured to favor particular imaging attributes. For example, these imaging attributes may relate to, amongst others, color constancy, efficient use of output elements, robustness, and metamerism under a set of conditions. The use of area coverage representations enables one metamer, i.e. an output color value in an output color space, to be selected from a set to modify, e.g. optimize, one or more of these imaging attributes. In one case, a particular output color value in the form of a Neugebauer Primary area coverage (NPac) vector may be selected from a set of NPac vectors that map to a common input color value. For example, an area coverage representation in the form of an NPac vector may be selected to minimize a change in observed color of an image output when subject to variations in the imaging system, i.e. on a basis of increased robustness. Area coverage representations may have a dimensionality defined by the number of available output elements (n) and a number of addressable states of each output element (k). In particular, there may be $k^n$ dimensions. For example, if an imaging system comprises a printing system with four colorants (e.g. Cyan, Magenta, Yellow and blacK—CMYK) wherein each colorant may be deposited at one of three levels, an area coverage representation space may have $3^4=81$ dimensions. This may be contrasted with the n or four dimensions of a comparative colorant space and the three dimensions of an input tristimulus color space (such as a RGB or Commission Internationale de l'Eclairage (CIE) XYZ based color space). Similarly, a light emitting element with three colors and ten illumination levels may have $10^3=1000$ dimensions.

The vastness of an area coverage representation space presents a challenge. For example, a given modification, improvement and/or optimization of an imaging attribute may need to search this high dimensionality space. Complexity is further increased for multi-dimensional modifications, improvements and/or optimizations. Comparative approaches in area coverage representation space, such as polyhedral search, can practically only be performed with limited, regular sampling that requires an exhaustive exploration of the space to complete the modification improvement and/or optimization. For example, a polyhedral search may comprise the sampling of an area coverage representation space using traversal of a set of tetrahedra or higher polyhedra. In this case the exploration may not be interrupted; it may require completion in full. Moreover, comparative methods are limited to high-powered computing resources such as multi-core server devices with large memories and high clock speeds; they typically cannot be performed on limited desktop and/or embedded devices as the time taken to perform the method may be prohibitive. As such these comparative methods cannot be performed within the imaging system itself, e.g. within a display and/or printing device, or within control routines on coupled computing devices.

Certain methods and systems described herein address this challenge by using a stochastic approach. This approach takes advantage of the ease with which individual, valid area coverage representations can be synthesized. In particular, use of random sampling together with sample grouping, for example into paramer sets as described below, provides a flexible and interruptible modification, improvement and/or optimization of one or more imaging attributes. This enables time-sensitive computation and enables these approaches to be implemented with more limited computing resources, such as in on-line routines with respect to an imaging system or a coupled computing device. This thus avoids the need for high-powered computing resources that may not be available to many users. The grouping of samples provides a modular approach that enables multiple sampling strategies to be combined. This may provide greater accuracy and flexibility of configuration. It also allows for a mitigation of modelling errors, since samples of similar predicted color are considered together, instead of aiming only at comparing samples of identical predicted color, which relies more on the accuracy of the prediction model used.

Certain examples described herein provide improvements to image processing technologies. For example, certain methods and systems described herein may be practically implemented as part of an imaging system to provide a modified color mapping that results in an improved imaging output with regard to the one or more attributes, e.g. an image output may be more robust to perturbations in the imaging system and/or may demonstrate greater color constancy in a wide range of illumination conditions, such as a better color match to a color defined under a predetermined illuminant.

Certain examples described herein relate to color mapping in an imaging system. Color mapping is a process by which a first representation of a given color is mapped to a second representation of the same color. Although "color" is a concept that is understood intuitively by human beings, it can be represented in a large variety of ways.

For example, color-related representations may be categorized into three main types: spectral representations; colorimetric representations; and device-dependent representations. Spectral representations consider properties such as power, intensity, reflectance and transmission as a function of wavelength across the visible spectrum. This is a representation of one or more physical properties that relate to 'color' that is independent of human vision. Colorimetric representations express a human observer's visual response to a stimulus in terms of its color. Example colorimetric representations are CIE XYZ color space and all color spaces derived from it (CIE LAB, CIECAM02, sRGB, Yule-Nielsen XYZ, etc.). Device-dependent representations represent color in a manner that is specific to a particular imaging device. For example, a device dependent color space may define inputs to produce an output on a specific imaging device (e.g., RGB or CMYK for printers, RGB for displays). These representations attain colorimetry as a function of the device. Device-dependent representations may also represent values that are directly applied to an imaging device's colorant (e.g. ink spaces, NPac spaces and/or display channel spaces). In the context of device-dependent representations, a device color model may be used to associate device color spaces with colorimetric and/or spectral ones, by predicting the latter from the former. The association between spectral and colorimetric spaces is typically not based on a color model, but rather defined using a system of colorimetry, such as those defined by the CIE, which results in XYZ and derived spaces. For each color representation, values within that representation may be visualized as expressing a position along the variable dimensions of a particular color space used by the representation.

When working with color, the term "gamut" refers to a multi-dimensional volume in a color space that represents color values that may be output by the imaging system. Colorimetric color spaces are three-dimensional, since the human eye has three types of cells (the cones) that are responsible for sensing color. Device-dependent color spaces have a number of dimensions that are based on the nature of the imaging device as described above; this number may be greater than three. A gamut may take the form of an arbitrary volume in the color space wherein color values within the volume are available to the imaging system but where color values falling outside the volume are not available. The terms color mapping, color model, color space and color gamut, as explained above, will be used in the following description.

FIG. 1 shows an exemplary imaging system 100. Certain examples described herein may be implemented within the context of this imaging system. The imaging system may be a display system or a printing system. In the example of FIG. 1, image data 110 is passed to an image processor 120. The image processor 120 processes image data 110. The image data 110 may comprise color data as represented in an input color space, such as pixel representations in an RGB color space. The input color space may be device-dependent or colorimetric. The image processor 120 maps the color data from the input color space to an output color space for use by an imaging device 130 to generate an image output 140. To do this a color mapping is used. In certain cases, input in a device-dependent color space may be first mapped to a colorimetric color space. The output color space may be device-dependent. Certain examples described below provide a configuration, e.g. in certain cases an optimization, of such a color mapping. The imaging device 130 may comprise a display or a printer.

In an implementation where the imaging system comprises a printing system, an image output may comprise colored inks deposited on a substrate. The substrate may be paper, fabric, plastic or any other suitable print medium. The printing system may comprise a halftone printing system. In this case, a halftone image output on a printing medium comprises a plurality of pixels wherein the spatial density of the pixels controls the colorimetry of area of the image. A halftone pixel comprises one or more droplets of colorant, e.g. ink fluid, released for example, by the nozzles in a printing head of a printing device. In certain cases, the colorant may be a non-fluid, such as a toner or wax. A plurality of halftone pixels results in a halftone image comprising regions of varying colorimetry, e.g. varying measured or seen output color. Although certain printing device examples are described with reference to one or more colorant levels, it should be understood that any color mappings may be extended to other printing fluids such as glosses and/or varnishes that may be deposited in a printing system and that may alter a perceived output color. In one case, a halftone image output may be generated from one or more area coverage representations, wherein the spatial density of the pixels is controlled by the area coverage values within the representations, such as NPac vectors for one or more pixels.

Figure 2:
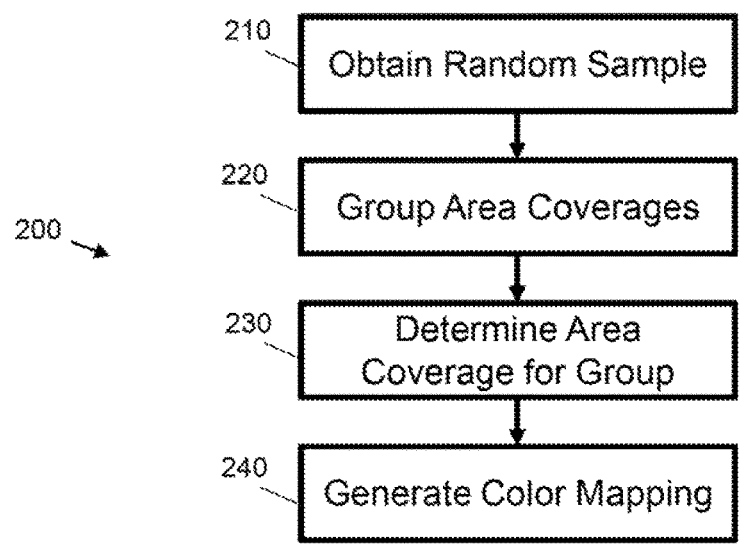
FIG. 2 is a flow diagram showing a method for configuring an imaging system according to an example.

FIG. 2 shows a method 200 for configuring an imaging system according to an example. The imaging system may be an imaging system 100 as illustrated in FIG. 1.

At block 210, a random sample of area coverage representations is obtained. This may be any pseudo-random or probabilistic selection as discussed in more detail below. In this context, an area coverage representation defines a distribution of output combinations for the imaging system. In one case, the area coverage representation may comprise an NPac vector, as described in more detail below.

At block 220, the obtained random sample, i.e. the set of area coverage representations, is split into a number of groups. This grouping of the obtained area coverage representations is performed based on an estimated colorimetry. This is equivalent to grouping or "binning" the area coverage representations into paramer sets. In this case, a paramer in a paramer set may be defined as a color value in a color space that has a color difference that is within a predetermined threshold when compared to another color (i.e. another paramer) in the set. For example, a paramer set may appear to contain shades of a particular observed color.

At block 230, an area coverage representation for each group is determined that modifies one or more estimated imaging attributes. For example, the area coverage representation may be selected on the basis that it improves or optimized one or more estimated imaging attributes. For example, an optimization function may be applied to each area coverage representation, and/or its colorimetric equivalent, wherein the function uses a weighted sum of a set of one or more imaging metrics that represent each attribute and that are calculated using the area coverage representation, and/or its colorimetric equivalent, as an input. In one case, this may comprise selecting a paramer in each paramer set that optimizes one or more of color constancy, output element use, robustness and metamerism under a variety of conditions.

At block 240, a color mapping is generated from an input color space to an area coverage representation space for use by the imaging system based on a color gamut for the random sample and the determined, i.e. selected, area coverage representations, e.g. the representations resulting from block 230. For example, the color mapping may be from a colorimetric color space or from a device color space to an area coverage color space. Example methods for performing this generation are discussed in more detail below.

In one case, the area coverage representation may comprise a plurality of NPac values, referred to herein as an NPac vector. An NPac vector represents a distribution of one or more Neugebauer Primaries (NPs) over a unit area. An NP is a combination of one or more output elements in an imaging system, wherein the total set of NPs represent the total number of output element combinations that can be output by the imaging system at a single halftone pixel. In a printing system, an NP may represent a combination of zero or more printing fluids or inks, wherein an NP having no (i.e. zero) inks represents a blank substrate and certain NPs represent one ink overprinted by one or more other inks, e.g. in an addressable area on a printed output. For example, in a binary (bi-level) printer, an NP is one of $2^n$ combinations of n inks within the printing system. For example, if a printing device uses CMY inks there can be eight NPs, these NPs relate to the following: C, M, Y, C+M, C+Y, M+Y, C+M+Y, and W (white or blank substrate indicating an absence of ink). With four inks there may be 16 NPs in a binary system. Other examples may also incorporate multi-level printers, e.g. where print heads are able to deposit k drop levels (e.g. k=3 for a system capable of 0, 1, 2 drop levels), in this case an NP may comprise one of $k^n$ combinations of n inks within the printing system. Although certain printing device examples are described with reference to one or more colorant levels, it should be understood that any color mappings may be extended to other printing materials such as glosses and/or varnishes that may be deposited in a printing system and that may alter a perceived output color; these may be modelled as NPs.

An area coverage representation defines the probability distributions for each NP for each pixel of an output image, e.g. a likelihood that $NP_x$ is to be placed or output at the pixel location. The imaging system is arranged such that an image output of a given area is generated to fulfill the probability distributions set by the NPac vectors of each pixel within the area. This may involve error diffusion, e.g. any difference between an actual image output for a pixel and its defined NPac vector is diffused to neighboring pixels such that an output over a large enough area accurately reproduces the NPac vectors of the pixels in that area. As such, an NPac vector is representative of the output element combination statistics of a given area.

An imaging system that uses NPacs may be referred to as a Halftone Area Neugebauer Separation (HANS) system. In this system, a color mapping outputs an NPac image from an input image. This color mapping may be the color mapping generated in block 240 of FIG. 2. The HANS system may then apply a halftoning step that selects output element combinations, e.g. NPs, device states or ink-overprints, based on the NPac vector at every pixel.

Figure 3:
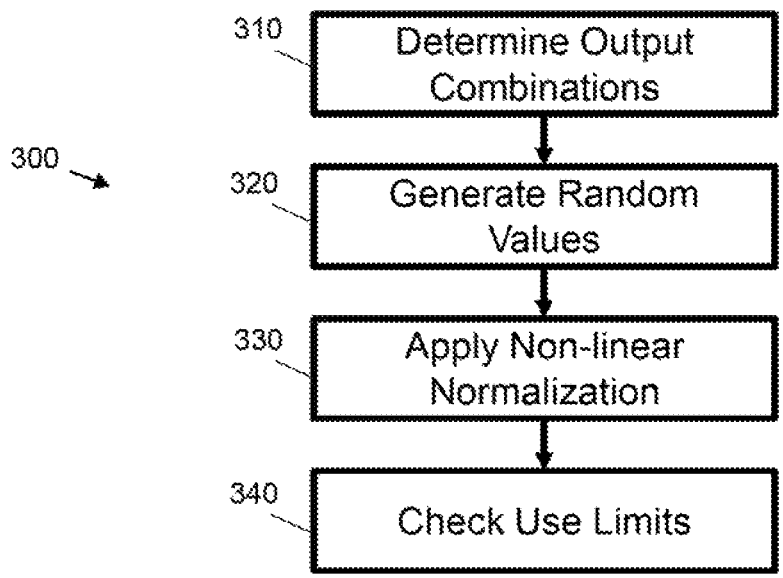
FIG. 3 is a flow diagram showing a method of obtaining random samples according to an example.

FIG. 3 is a flow diagram showing a method 300 of obtaining random samples according to an example. All or part of this method 300 may be used to implement block 210 in FIG. 2 in a given implementation.

At block 310 a number of output combinations are selected that are to have non-zero area coverage values. This may comprise determining a set of output element combinations, e.g. NPs, in an area coverage vector, e.g. a NPac, that are to have non-zero area coverage values. This selection may be comprise randomly selecting the number of output combinations from a configurable weighted probability distribution.

Performing block 310 separately from selecting random area coverage values for the NPs allows for control over the complexity of the sampled area coverage representations. In one case, it allows for the introduction of a bias in generation of the random area coverage representations. For example, a suitably configured weighted probability distribution may bias the block to generate fewer or more output element combinations. In one case, preference may be given to the presence of a white or blank substrate NP in the set of output element combinations. In a printing system, this may help to reduce ink use. Additionally, or alternatively, the bias may reflect further explicit NP colorimetry considerations with regard to number of NPs in the set with non-zero values as well as the specific NPs within that set. For example, a bias may favor NPs that are most different from other NPs in terms of their colorimetry, e.g. within the set of all available NPs. This may be beneficial to reduce the representation of many similar, e.g. in terms of a colorimetric color difference, NPs that cluster around black. For example, NPs that stack many ink drops of different inks may result in similar outputs that are that are dark and are of low chroma.

At block 320 a set of area coverage values are randomly generated for the number of non-zero output combinations selected at block 310. This random generation includes pseudo-random generation. In one case a uniform probability distribution may be used to randomly select each area coverage value for the non-zero output combinations. For example, this may be the case if no a priori basis is required for sampling the area coverage representation space. At block 330, a non-linear normalization is applied to the set of random values such that the set of set of area coverage values sum to unity. This may be 1 for area coverage representation values in the range of 0 to 1, or 100% for percentage representations in the range of 0 to 100%. Normalization is required given the probabilistic nature of the area coverage representation—all area coverage values for all output combinations in the representation need to sum to unity, e.g. all NP area coverage values in an NPac vector need to sum to unity. In the present example, it not possible to linearly normalize a set of random area coverages values, since such normalization of individually uniformly randomly generated values will result in a normal distribution across the multidimensional area coverage (e.g. NP) space. Instead, in the present example, a non-linear normalization is applied, which results in the area coverage (e.g. NP) space being sampled uniformly. In one case the non-linear normalization may be of the form:

$$a_{i(norm)} = \frac{-\log(a_i)}{\sum_{i=1}^{N} -\log(a_i)}$$

where $a_{i(norm)}$ is a normalized area coverage value, $a_j$ is a random area coverage value sampled from a uniform distribution and n is the number of area coverage values being generated, e.g. the number of output combinations selected at block 310.

After normalization, the generated area coverage values are assigned to each of the output combinations selected at block 310. For example, if the NPs C, C+Y, M+Y and W are selected at block 310, four values may be sampled from a uniform probability distribution at block 320 and normalized as set out above in block 330; these four values may then be respectively assigned to the NPs (e.g. 0.2, 0.4, 0.3 and 0.1). This results in a valid area coverage representation, e.g. an NPac of [C=0.2, M=0, Y=0, C+M=0, C+Y=0.4, M+Y=0.3, and W=0.1].

At block 340, a check may be made that the generated area coverage representation can be output by the imaging system. For example, an imaging system may have one or more constraints and/or limits for its output elements; e.g. a printing system may have ink use limits and a display device may have power limits. At block 340, it is determined whether an output use value for each area coverage representation exceeds one or more limits for the imaging system. In a printing system, this may be a determination as to whether values of an NPac vector result in an amount of ink on a given substrate that exceeds a maximum limit for the substrate. If it is determined that one or more limits are exceeded the generated area coverage representation may be discarded and the method 300 repeated to generate a new random area coverage representation. If the generated area coverage representation is within the predefined limits it may be retained as a value for the random sample.

The method 300 of FIG. 3 may be iterated to obtain a random sample of area coverage representations. This may comprise a set of NPac vectors. A configurable number of area coverage representations that make up the random sample may be defined. The smaller the number of area coverage representations in the random sample, the finer the control over the granularity at which the process can be interrupted; the larger the number the greater the potential throughput derived from a continuity of data access. Following the method 300 of FIG. 3, each area coverage representation in the random sample represents a valid, within limit area coverage representation.

The method 300 of FIG. 300 enables the cardinality of the area coverage representations that are evaluated in the modification, improvement and/or optimization process to be parameterized. This is achieved by allowing the number of output combinations to be configurable, e.g. the number of non-zero NP values used per NPac vector.

Figure 4:
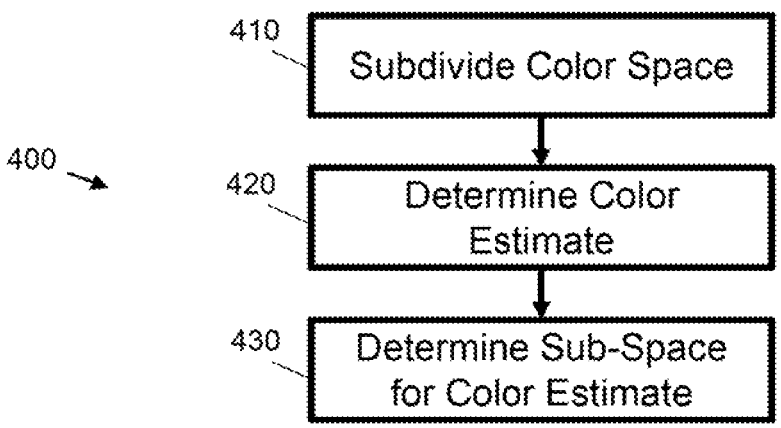
FIG. 4 is a flow diagram showing a method of grouping area coverage representations according to an example.

FIG. 4 shows a method 400 of grouping area coverage representations according to an example. At block 410 a colorimetric color space is selected and sub-divided. In one case, the color space is a CIELAB color space. The color space is divided into a plurality of sub-spaces of a predetermined size. This may comprise configuring a data structure such as a dictionary or an array that has extendable elements for each sub-space. Each sub-space is a "bin" of a certain size in the dimensions of the color space, such as a three-dimensional volume in CIELAB color space. Each sub-space represents a paramer set, e.g. as opposed to a single point in the color space, which may represent a metamer set.

At block 420 a color estimate for the imaging system is determined in the color space for each obtained area coverage representation, e.g. each representation in the random sample obtained at block 210. This may comprise using a system model of the imaging system to simulate an output of the imaging system. For example, a printing system may use a printer model to reflect the behavior of the printing system or a display system may use a display device model to reflect the behavior of the display system. A printer model may comprise parameters such as, amongst others, dot size and shape, dot placement statistics and dot size variation statistics. The printer model may thus simulate a dot structure on a given substrate from a digital halftone image. Block 420 may also comprise using a color model for the imaging system to predict a color of a simulated output of the imaging system derived from the system model. For example, in the aforementioned printing system example, the color model may be a function to predict a color in a colorimetric color space, e.g. to estimate colorimetry, based on a drop-on-substrate simulation as generated using the system model.

In the case where the imaging system comprises an ink-jet color printer, the system model may be a model representing one or more properties of the ink-jet printer. For example, the system model may comprise statistical properties of ink droplets deposited on substrate. The system model may incorporate measured data from the imaging system, such as information about missing printer nozzles, misalignment of nozzles or pen health, and/or may model statistical variations observed in the imaging system, such as drop placement error and drop weight variations.

In one implementation, the color model may comprise one or more of the Kubelka-Munk model of drop overprint prediction, the Yule-Nielsen model for optical dot gain prediction and the Neugebauer model for the optical integration of print structure below the human visual system's resolving power. In a case where the imaging device comprises an ink-jet printer, the color model may apply each of the Kubelka-Munk, Neugebauer and Yule-Nielsen models in that order to predict a color, e.g. a colorimetric or spectral color value, from a drop-on-substrate simulation of the ink-jet printer as provided by the system model. In one case, the color model may first be used to calculate a reflectance spectra that is mapped to a colorimetric color value, such as a CIE XYZ or LAB value. The determined colorimetric color value may also be used as part of blocks 230 and 240, i.e. the selected area coverage representation and/or the color mapping may be derived from the determined colorimetric color value.

The use of system and/or color models as described enables configuration, e.g. such as optimization, to be performed by basing predictions on simulations of imaging system outputs and the associated statistics, e.g. ink-on-substrate statistics or light emitting element outputs statistics, rather than digital halftone statistics. This allows for greater accuracy, e.g. the selected area coverage representations are more likely to reflect corresponding optimizations on a real-world output of the imaging system.

Returning to FIG. 4, at block 430 a sub-space from the plurality of sub-spaces that is associated with each color estimate is determined. For example, a color estimate in the form of a colorimetric color value, such as a CIE XYZ or LAB value may be mapped to a particular "bin" in XYZ or LAB color space. This may be implemented by adding the area coverage representation and its corresponding colorimetric color value to a field in an array or dictionary as discussed at block 410. The result of the method 400 of FIG. 4 is a set of paramer bins in colorimetric space that each contain a set of random area coverage representations, such as a set of NPac vectors and their corresponding colorimetric color values.

In certain examples, the process of grouping area coverage representations, e.g. as set out in block 220 and/or method 400, comprises grouping the obtained area coverage representations with an additional set of imported area coverage representations. For example, the grouping block may be extended to group metamer sets generated by comparative polyhedral search methods. This may be performed by determining the colorimetric color value associated with the metamer set and then adding all area coverage representations within the set to the paramer set that includes the colorimetric color value, e.g. within the bin that includes that value. Area coverage representations that are generated by other sources, such as other imaging systems or pipelines, may also be grouped with the random area coverage representations in a similar manner. This allows for hybrid solutions that take advantage of the exhaustiveness of a polyhedral search method and the flexibility of random sampling.

In certain examples, block 230 of FIG. 2 comprises taking each grouping of sampled area coverage representations, e.g. each paramer bin, and for each member within a grouping using the system and color models described above to estimate the colorimetry associated with the member. In certain cases, one or more of the system and color models may be used to determine values for one or more imaging attributes to be improved. If each member comprises an NPac vector, block 230 may comprise predicting a color of the vector and computing one or more attributes based on one or more of the NPac vector and the predicted color. Taking ink use as an example attribute, this may comprise determining the ink use of each constituent NP in an NPac vector, e.g. by summing the ink drop volumes and/or weights of its constituent inks, to obtain an area-coverage-weighted sum for the NPac vector, e.g. by weighting by the area coverage values of each constituent NP. Other attributes comprise, amongst others, grain and color inconstancy. The latter may be computed from spectra based on NPac vectors as opposed to colorimetries.

In each bin an NPac vector that modifies, e.g. optimizes, a function of a set of imaging attributes, e.g. that minimizing or maximizes the function, may be selected as a selected area coverage representation for the bin. Colorimetries, e.g. in the optical integration space of the imaging system (e.g., $XYZ''$), may then be tessellated and the tessellation used for mapping from colorimetry to NPac space by interpolation.

In certain examples, block 240 of FIG. 2 comprises configuring a data structure to represent a convex hull associated with the random sample in the imaging system's optical integration space. For example, this space may comprise a CIE XYZ color space with Yule-Nielsen correction (a '$XYZ''$' color space). This data structure enables the color gamut of the random sample to be tracked separately from the set of selected area coverage representations to gain access to its full volume, since the full set of polyhedra is not traversed, e.g. as compared to comparative polyhedral search examples. As such, at any point following block 210, the area coverage representations forming the random sample and/or their determined colorimetries may be added to this data structure to define the convex hull. This may be performed iteratively, e.g. a random area coverage representation may be added to the data structure after passing the check at block 340 of FIG. 3 and the convex hull may be recomputed based on the contents of the data structure.

In one case, the colorimetric color space that is used to group the area coverage representations may comprise a different colorimetric color space from that used to generate the color mapping at block 240. For example, the former may comprise a CIELAB-based color space and the latter may comprise a CIEXYZ-based color space, such as CIE XYZ with Yule-Nielsen correction or $XYZ''$ color space. In particular, the grouping may be performed in a different colorimetric color space from that used to represent the convex hull. For example, in the grouping process visual similarity may be required. Hence, a CIE LAB color space may be used as it is approximately visually uniform. When constructing a color mapping, a colorimetric color space may be required that corresponds to the transitions found in an area coverage color space. For example, CIE $XYZ''$ may be used as it corresponds to the transitions found in an NPac color space, e.g. a mean of two selected NPacs may have a $XYZ''$ representation that is also mean of the corresponding $XYZ''$ representations of the selected NPacs. Put another way, the colorimetric color space used to construct the color mapping may be selected such that the resulting color gamut is convex. In certain color spaces, such as CIE LAB, a gamut may exhibit concavities. A CIE $XYZ''$ color space is suitable as it models the optical integration of a spatial output structure.

The output of blocks 220 and 230 respectively comprises a set of area coverage representations and a set of selected area coverage representations, where each set may comprise one or more NPac vectors. In certain cases, the output further comprises estimated colorimetries for both sets of area coverage representations. For example, two sets of $XYZ''$-NPac vector pairs may be generated; one set being based on the random sample of area coverage representations and the other set being based on the selected area coverage representations. The first set of $XYZ''$-NPac vector pairs may be used to compute the convex hull. In this case, NPac vectors obtained from block 210 may be used as an input to predict corresponding $XYZ''$ values. This may be performed in a similar manner to block 420. In certain cases a conversion function may be used to convert the color estimate at block 420, e.g. a CIE LAB value, to a $XYZ''$ value. The convex hull may then be computed from the $XYZ''$ values, wherein the original NPac vectors used to predict the $XYZ''$ values are also stored, e.g. in the aforementioned data structure. In the case of the attribute evaluation at block 230, a selected area coverage representation, e.g. an NPac vector is generated for each grouping. A similar process is then performed to predict the $XYZ''$ value associated with the selected area coverage representation. In one case, the predicted $XYZ''$ values from the first set of $XYZ''$-NPac vector pairs may be used as an input to an optimization function to determine an optimized area coverage representation at block 230 for each grouping. Hence, at the end of the process there may be seen to be two "bags", e.g. data structures with associated values, of $XYZ''$-NPac pairs; these may then be merged to generate the color mapping at block 240. For example, the color mapping may be generated by Delaunay-tessellating the full set of $XYZ''$ values and then using that tessellation for interpolation. In this case, the color mapping is applied, e.g. as part of the imaging system 100, by first transforming an input color to a corresponding $XYZ''$ value, then locating a tessellating tetrahedron that contains or encloses the $XYZ''$ value and then computing the color's barycentric coordinates within the located tetrahedron. These barycentric coordinates, which sum to unity, are used as weights to combine the NPac vectors that correspond to the located tetrahedron's vertices.

The colorimetries estimated for the NPac vectors for the latter set may be tessellated to determine colorimetries in the CIEXYZ-based color space, resulting in a set of $XYZ''$ to NPac mappings. These mappings, combined with the convex hull or gamut computed from the set of area coverage representations, may form the color mapping, e.g. a mapping from $XYZ''$ color space to NPac color space. This may both maximize the gamut and optimize one or more imaging attributes. In certain examples, the resulting color mapping may be further extended with other mappings to the colorimetric space while retaining the area coverage representation output. For examples, a XYZ" to NPac color mapping may be concatenated with a RGB to XYZ" color mapping to generate a RGB to NPac color mapping. Such a color mapping may be applied to image data 110 in the form of an RGB pixel values. This color mapping may then be applied by the imaging system to generate an image output 140 based on the input image data 110, e.g. to output a set of NPac pixel values from a set of input XYZ or RGB pixel values, the NPac pixel values being used to print an image on a substrate in a printing system.

Figure 5:
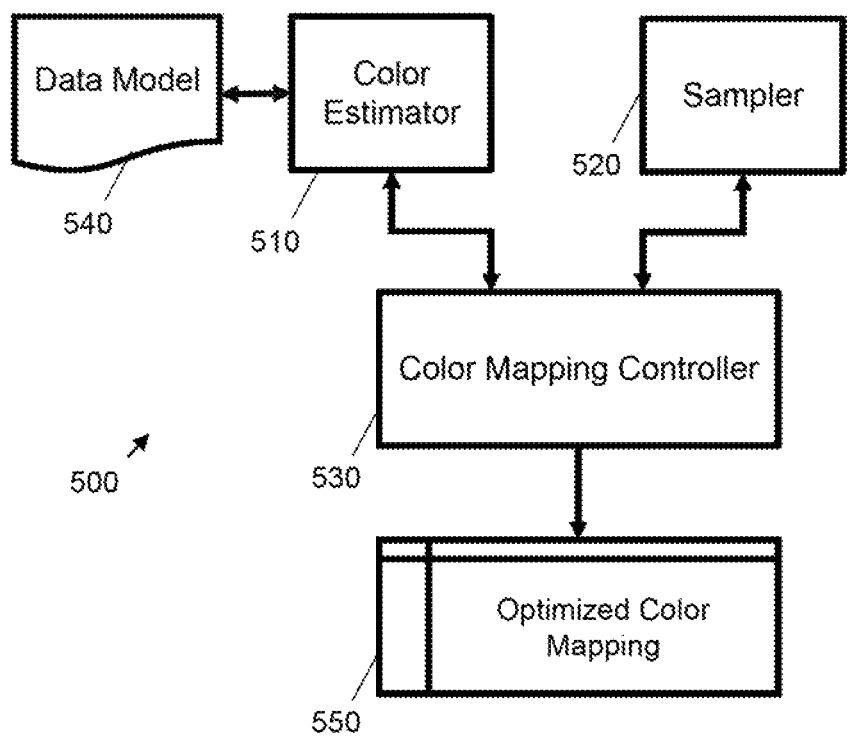
FIG. 5 is a schematic illustration showing an apparatus for configuring an imaging system according to an example.

FIG. 5 shows an apparatus 500 that may be used to configure an imaging system according to an example. The apparatus 500 may be configured to implement one or more of the methods described above. The apparatus 500 may form part of an imaging system, e.g. comprise control electronics for a display or a printer; may form part of a computing system communicatively-coupled to the imaging system, e.g. be implemented by a combination of computer hardware and computer program code, such as interface electronics, a process, memory, an operating system and one or more driver modules; and/or may form part of a remote server computing device.

The apparatus 500 of FIG. 5 comprises a color estimator 510, a sampler 520 and a color mapping controller 530. The color estimator 510 is arranged to access a data model 540 representative of the imaging system and to determine, based on the data model, a color estimate of an area coverage vector, the area coverage vector defining a distribution of output combinations for the imaging system. The color estimate may comprise one or more colorimetric color values. The area coverage vector may comprise an NPac vector. The sampler 520 is arranged to obtain a random sample of area coverage vectors. The sampler 520 may be arranged to perform all or part of the method 300 of FIG. 3. The color mapping controller 530 is arranged to access a random sample from the sampler 520, use the color estimator 510 to group area coverage vectors in the random sample into color groups, select an area coverage vector in each color group based on a comparison of one or more imaging metrics for the group and determine a color mapping 550 from an input color space to an area coverage vector space for use by the imaging system based on a volume of available colors for the random sample and the selected area coverage vectors. In one case, the color mapping 550 comprises a look-up table with an area coverage vector as an output, e.g. an RGB or XYZ-based to NPac lookup table.

The data model 540 may comprise one or more of the color model and the system model as previously described. In one implementation, the imaging system may comprise a printing system and the area coverage vector defines a distribution of overprint combinations, e.g. an NPac vector. In this case, the apparatus and/or the imaging system may comprise a print controller arranged to use the color mapping to map color data for an input image from the input color space to an NPac vector for production of a printed output. In this case to construct the data model 540, test prints may be made on the printing system. These test prints may be inspected or image-captured to determine the parameters for the model, for example parameters such as dot size and shape, dot placement statistics and dot size variation statistics. Color behavior for a particular NP or NPac may be determined by printing and measuring test prints comprising different NPac vectors. This may be performed using NPac vectors that are within ink limits and/or using combinations of NPs with certain within ink limit values, e.g. using the White or blank substrate NP, to generate a test print that may be used to characterize an over-the-limit NP while not exceeding an ink limit.

Certain examples described herein provide a configuration process that is arbitrarily interruptible and that allows for continuous control over the degree of improvement and/or optimization, e.g. wherein intermediate results may be used to continue a previous process. These examples produce results that perform to the level of significantly more lengthy, polyhedral approaches. For example, an ability to interrupt the process is enabled by the use of random sampling, where an arbitrary number of random samples may be used as the basis for the optimization, as opposed to having to traverse a full set of systematic samples, as is the case in the polyhedral approach. In this manner, even if the process is set up to obtain and process a certain number of random area coverage representations (e.g. 1000), and an interrupt call is received (e.g. after only 500 have been generated), the examples herein may stop the generation of further area coverage representations that form the random sample and just complete the process that leads to the generation of a color mapping from whatever random area coverage values have been generated up until the moment of interrupt (e.g. the 500 that have been generated). It should be noted that the term "random", as used herein, refers to any probabilistic and/or stochastic process and includes reference to pseudo-random selection, e.g. an implementation of a random sampling may, on a computer system, comprise a pseudo-random sampling that effectively models the randomness of area coverage selection.

Figure 6:
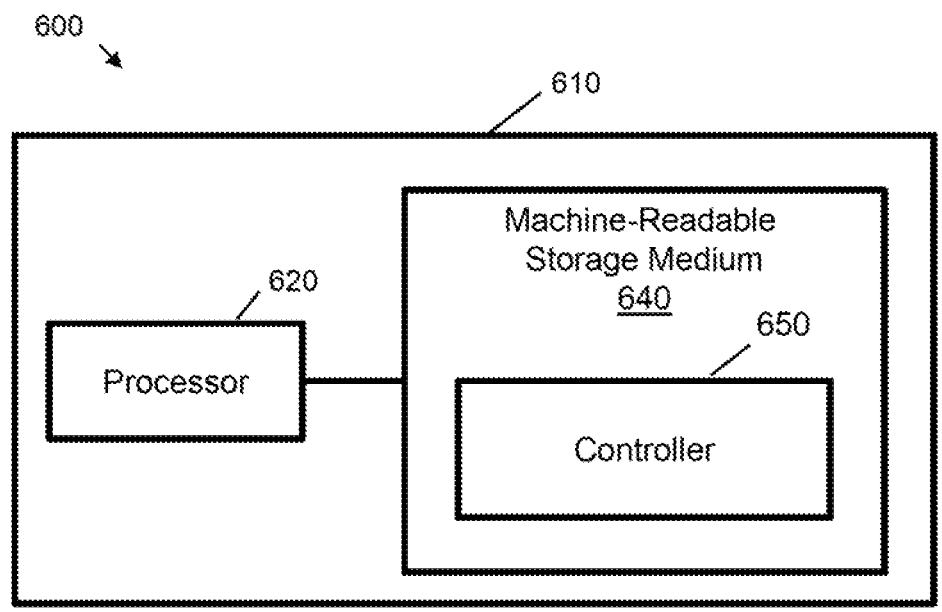
FIG. 6 is a schematic diagram showing a processing device according to an example.

As described above, certain methods and systems as described herein may be implemented by a processor that processes computer program code that is retrieved from a non-transitory storage medium. For example, any one or more of the methods 200, 300 and 400 may be implemented by computer program code that is implemented by a computing device, including a processor of a computing system embedded in an imaging system such as a display or printing system. In this context, FIG. 6 shows an example 600 of a computing device 610 comprising a machine-readable storage medium 640 coupled to a processor 620. In certain case the computing device 610 may comprise a stand-alone computing device, such as a desktop computer or server communicatively coupled to an imaging device; in other cases the computing device may comprise part of a printer, scanner, display device or the like. Machine-readable media 640 can be any media that can contain, store, or maintain programs and data for use by or in connection with an instruction execution system. Machine-readable media can comprise any one of many physical media such as, for example, electronic, magnetic, optical, electromagnetic, or semiconductor media. More specific examples of suitable machine-readable media include, but are not limited to, a hard drive, a random access memory (RAM), a read-only memory (ROM), an erasable programmable read-only memory, or a portable disc. In FIG. 6, the machine-readable storage medium comprises program code to implement a controller 650. The controller 650 is arranged to implement one or more of the methods described above. While certain examples may be implemented by a computing device, they provide an effect that is demonstrated with respect to an image output, e.g. an image displayed on a screen or printed by a printer.

The preceding description has been presented to illustrate and describe examples of the principles described. This description is not intended to be exhaustive or to limit these principles to any precise form disclosed. Many modifications and variations are possible in light of the above teaching.

What is claimed is:

1. A method for configuring an imaging system comprising:
    obtaining a random sample of area coverage representations, an area coverage representation defining a distribution of output combinations for the imaging system;
    grouping the obtained area coverage representations into a number of groups based on estimated colorimetry for the imaging system;
    determining a selected area coverage representation for each group that modifies one or more estimated imaging attributes; and
    generating a color mapping from an input color space to an area coverage representation space for use by the imaging system based on a color gamut for the random sample and the selected area coverage representations.

2. The method of claim 1, wherein obtaining a random sample of area coverage representations comprises:
    selecting a number of output combinations to have non-zero area coverage values; and
    randomly generating a set of area coverage values for the selected number of output combinations.

3. The method of claim 2, wherein randomly generating a set of area coverage values comprises:
    generating a set of random values for the selected number of output combinations;
    applying a non-linear normalization to the set of random values such that the set of set of area coverage values sum to unity.

4. The method of claim 2, wherein selecting a number of output combinations comprises randomly selecting the number of output combinations from a configurable weighted probability distribution.

5. The method of claim 1, wherein obtaining a random sample of area coverage representations comprises:
    determining whether an output use value for each area coverage representation exceeds a limit for the imaging system,
    wherein an area coverage representation is used if it is within the limit and regenerated if it exceeds the limit.

6. The method of claim 1, wherein grouping the obtained area coverage representations comprising:
    subdividing a color space into a plurality of sub-spaces of a predetermined size;
    determining a color estimate for the imaging system in the color space for each obtained area coverage representation; and
    determining a sub-space from the plurality of sub-spaces that is associated with each color estimate.

7. The method of claim 6, wherein determining a color estimate comprises:
    configuring a system model of the imaging system for use in simulating an output of the imaging system;
    configuring a color model for the imaging system to predict a color of a simulated output of the imaging system derived from the system model.

8. The method of claim 1, wherein grouping the obtained area coverage representations comprises:
    grouping the obtained area coverage representations into sub-spaces of a predetermined size within an International Commission on Illumination (CIE) LAB based color space.

9. The method of claim 1, wherein color gamut is computed as a convex hull in an optical integration space for the imaging system based on the area coverage representations and their associated colorimetries.

10. The method of claim 1, grouping the obtained area coverage representations comprises:
    grouping the obtained area coverage representations with an additional set of imported area coverage representations.

11. Apparatus for configuring an imaging system comprising:
    a color estimator arranged to access a data model representative of the imaging system and to determine, based on the data model, a color estimate of an area coverage vector, the area coverage vector defining a distribution of output combinations for the imaging system;
    a sampler arranged to obtain a random sample of area coverage vectors; and
    a color mapping controller arranged to:
        access a random sample from the sampler;
        use the color estimator to group area coverage vectors in the random sample into color groups;
        select an area coverage vector in each color group based on a comparison of one or more imaging metrics for the group; and
        determine a color mapping from an input color space to an area coverage vector space for use by the imaging system based on a volume of available colors for the random sample and the selected area coverage vectors.

12. The apparatus of claim 11, wherein the color mapping controller is arranged to generate a color mapping in the form of a look-up table with an area coverage vector as an output.

13. The apparatus of claim 11, wherein the imaging system is a printing system and an area coverage vector defines a distribution of overprint combinations.

14. The apparatus of claim 11, comprising:
    a print controller arranged to use the color mapping to map color data for an input image from the input color space to a Neugebauer Primary area coverage vector for production of a printed output.

15. A non-transitory computer-readable storage medium comprising a set of computer-readable instructions stored thereon, which, when executed by a processing system, cause the processing system to:
    obtain a random set of area coverage representations,
    determine a color estimate for an imaging system in the color space for each obtained area coverage representation;
    determine a sub-space from a plurality of colorimetric sub-spaces that is associated with each color estimate;
    determine a set of attribute estimates for each obtained area coverage representation;
    select an area coverage representation in each sub-space that modifies the set of attribute estimates;
    determine a color gamut based on the set of random area coverage representations; and
    generate a color mapping from an input color space to an area coverage representation space for use by the imaging system based on the color gamut and the selected area coverage representations.

16. The computer-readable storage medium of claim 15, wherein obtaining a random set of area coverage representations comprises:

selecting a number of output combinations to have non-zero area coverage values; and randomly generating a set of area coverage values for the selected number of output combinations.

17. The computer-readable storage medium of claim 16, wherein randomly generating a set of area coverage values comprises:

generating a set of random values for the selected number of output combinations;

applying a non-linear normalization to the set of random values such that the set of set of area coverage values sum to unity.

18. The computer-readable storage medium of claim 16, wherein selecting a number of output combinations comprises randomly selecting the number of output combinations from a configurable weighted probability distribution.

19. The computer-readable storage medium of claim 15, wherein obtaining a random set of area coverage representations comprises:

determining whether an output use value for each area coverage representation exceeds a limit for the imaging system, wherein an area coverage representation is used if it is within the limit and regenerated if it exceeds the limit.

20. The computer-readable storage medium of claim 15, wherein the color gamut is computed as a convex hull in an optical integration space for the imaging system based on the area coverage representations and their associated colorimetries.

* * * * *

UNITED STATES PATENT AND TRADEMARK OFFICE
CERTIFICATE OF CORRECTION

PATENT NO. : 10,171,706 B2
APPLICATION NO. : 15/520303
DATED : January 1, 2019
INVENTOR(S) : Peter Morovic et al.

Page 1 of 1

It is certified that error appears in the above-identified patent and that said Letters Patent is hereby corrected as shown below:

In the Claims

In Column 13, Claim 3, Line 33, delete "set of set of" and insert -- set of --, therefor.

In Column 15, Claim 17, Line 11, delete "set of set of" and insert -- set of --, therefor.

Signed and Sealed this
Ninth Day of April, 2019

Andrei Iancu
*Director of the United States Patent and Trademark Office*